Patented June 27, 1944

2,352,515

UNITED STATES PATENT OFFICE 2,352,515

UNSATURATED POLYNITRILES AND PROCESS FOR MAKING SAME

Herman A. Bruson, Philadelphia, Pa., assignor to The Resinous Products & Chemical Company, Philadelphia, Pa., a corporation of Delaware No Drawing. Application December 6, 1941, Serial No. 421,951

14 Claims. (Cl. 260—464)

This invention relates to addition compounds of acrylonitrile with other olefinic nitriles having one or more reactive hydrogen atoms attached to an aliphatic carbon atom.

I have found that in the presence of an alkaline condensing agent as a catalyst acrylonitrile reacts with other $\alpha,\beta$ or $\beta,\gamma$ unsaturated nitriles to introduce at least one $\beta$-cyanoethyl group in the alpha position. The products formed, unsaturated polynitriles, are well-defined chemical compounds which, upon hydrolysis, yield unsaturated polycarboxylic acids or polycarboxylic amides that are useful for the preparation of synthetic resins.

The olefinic nitriles with which acrylonitrile reacts according to this invention belong to a class of compounds which possess a three-carbon tautomeric or desmotropic system adjacent to the cyano-group. The essential requirements of this system are that it possess a double bond between two of the carbon atoms and a hydrogen atom capable of movement from one carbon atom to another of the three-carbon system. In this system, there is an equilibrium between two tautomeric forms as a result of shifts of double bond and hydrogen. Thus,

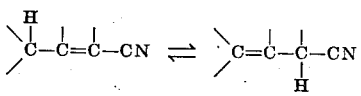

The indicated free valences may be satisfied by hydrogen or organic groups, and the system has been found operative with a great variety of substituents, including monovalent hydrocarbon groups and bivalent groups, which, jointly with the two terminal carbon atoms of the system, form a cycle.

A specific example of the equilibrium in a three-carbon atom desmotropic system is found in the cases of the isomers, crotononitrile and allyl cyanide:

In the presence of alkali, the equilibrium shifts toward the left. Since the reaction between one of these olefinic nitriles and acrylonitrile takes place in the presence of an alkaline catalyst, the products obtained from either crotononitrile or allyl cyanide have the same structure.

Three-carbon desmotropic systems are discussed in detail in the following references: Birch, Kon, and Norris, J. Chem. Soc. 123, 1361 (1923); Birch and Kon, ibid. 123, 2440 (1923); Kandiah and Linstaed, ibid. 1929, 2139; and Letsch and Linstaed, ibid. 1932, 443.

Typical $\alpha,\beta$ or $\beta,\gamma$ unsaturated nitriles, having reactive hydrogen attached to carbon, which combine with acrylonitrile in the presence of an alkaline catalyst include allyl cyanide, $\beta$-methyl allyl cyanide, $\beta$-benzyl allyl cyanide, crotononitrile, $\beta$-methyl crotononitrile, styryl aceto-nitrile, $\alpha$ - cyclohexylidene aceto-nitrile, 2-pentenonitrile, 3-pentenonitrile, $\alpha$-ethylidene glutaronitrile, $\alpha$-ethylidene-$\beta$-methyl glutaronitrile, sorbic nitrile, sorbyl cyanide, $\alpha$-hexenonitrile, $\beta$-methyl $\alpha$-nonenonitrile, glutaconic nitrile, and similarly constituted nitriles possessing a reactive methylene or methenyl grouping.

Among the alkaline condensing agents which have been found effective for promoting these reactions are the oxides, hydroxides, hydrides, amides, and alcoholates of the alkali metals, or the alkali metals themselves. There may also be used strongly basic non-metallic hydroxides, such as the quaternary ammonium hydroxides. Of these, a particularly effective agent is an aqueous solution containing 40% of trimethyl benzyl ammonium hydroxide (available commercially as "Triton B").

The quantity of alkaline condensing agent required is relatively small, amounts of the order of 1% to 10% on the combined weight of the reactants usually being sufficient.

One or several of these alkaline materials are suspended or, preferably, dissolved in the reactive unsaturated aliphatic nitrile itself or in a solution thereof in an inert liquid such as dioxane, ether, benzene, or in a liquid which is less reactive than the reacting components, such as water, or tertiary butyl alcohol. The condensation takes place readily at temperatures ranging from about 0° to about 80° C., although initial temperatures of about 10° to about 50° C. are preferred. The reaction is usually exothermic so that cooling, at least during the initial part of the condensation, is generally advantageous in order to control the vigor of the reaction and to prevent undesired polymerization, resinification, or side reactions. In this connection, it is sometimes desirable to add polymerization inhibitors, such as hydroquinone, $\alpha$-naphthol, copper powder, or copper salts.

The cyanoethylation products obtained by the present invention are new compounds. They are useful not only for the preparation of the corresponding unsaturated polycarboxylic acids or polycarboxylic amides, but they can be hydrogenated to the corresponding saturated nitriles or saturated amines and polyamines. Their nitrile groups may also be converted by customary reactions of the —CN groups into the corresponding amidines, amino-acids, cyano-acids, esters, aldehydes, thioamides, and ketones. Many of the compounds find uses in diverse fields, including plastics, pharmaceuticals, insecticides, and other commercial applications.

The following examples illustrate this invention, it being understood that, although trimethyl benzyl ammonium hydroxide is the preferred alkaline condensing agent, others, such as sodium methylate, potassium tertiary butylate, sodium hydroxide, lithium hydroxide, sodium hydride, sodium oxide, tetramethyl ammonium hydroxide, dimethyl dibenzyl ammonium hydroxide and other strongly basic hydroxides may be used.

*Example 1*

To a solution of 83.5 grams of crotononitrile (mixture of cis and trans), 100 grams of tertiary butyl alcohol and 5 grams of aqueous 40% trimethyl benzyl ammonium hydroxide, there is added, dropwise, 199 grams of acrylonitrile during the course of 3½ hours while the reaction mixture is stirred and cooled to 30–35° C. The mixture is stirred four hours longer and then allowed to stand for 24 hours at ordinary room temperature. It is then acidified with dilute hydrochloric acid of 10% strength, and washed twice with cold water. The oil is separated and evaporated to dryness on a water bath at 80° C. under reduced pressure (30–40 mm.). The residual oil (142 grams) is distilled in vacuo at 1 mm. and the following fractions collected:

I. 41 grams up to 200°/1 mm. (mostly 110–120°/1 mm.)

II. 52 grams 200–255°/1 mm. (mostly 210–220°/1 mm.)

III. Residue (does not distil without decomposition)

Fraction I, upon redistillation in vacuo, gave 25 grams of a colorless oil boiling at 134–137°/10 mm., having the formula $C_7H_8N_2$, corresponding to the probable structure:

$$CH_3—CH=C—CN$$
$$\quad\quad\quad\quad|$$
$$\quad\quad\quad CH_2—CH_2CN$$

having $n_D^{25}$ 1.4636; $d_4^{25}$ 0.9622.

Upon saponification with aqueous sodium hydroxide solution and subsequent acidification with hydrochloric acid, it furnishes a crystalline unsaturated dicarboxylic acid, $C_7H_{10}O_4$, having a melting point of 154° C.

Fraction II, upon redistillation in vacuo, boils at 195–205°/1 mm. and solidifies on standing. The solid can be crystallized from water or methanol and forms colorless needles melting, when pure, at 60–61°, having the formula $C_{10}H_{11}N_3$, corresponding to a di-cyanoethylation product of crotonitrile having the probable structure:

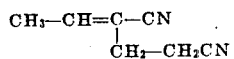

*Example 2*

A mixture of 134 grams of pure allyl cyanide and 106 grams of acrylonitrile is added, dropwise, to a stirred solution of 50 grams of tertiary butyl alcohol and 4 grams of aqueous 40% trimethyl benzyl ammonium hydroxide cooled in an ice bath so that the reaction temperature is maintained at 9–12° C. The addition requires three hours. After the addition above noted, the mixture is stirred for one hour longer at 10° C. and then for two hours at room temperature. Dilute hydrochloric acid (10%) is added until the solution is just acid to Congo red indicator, and then 250 cc. of ethylene dichloride is added, followed by 25 cc. of water. After thorough mixing, the ethylene dichloride layer is separated and evaporated to dryness on a steam bath under reduced pressure. The residual oil, weighing 189 grams, is distilled in vacuo at 1 mm. The fraction boiling between 210° and 245°/1 mm. (mostly 220°/1 mm.) is a slightly yellow liquid weighing 96 grams. It is dissolved in 2,000 cc. of hot water and cooled to 10° C., whereupon it crystallizes in long, colorless needles. The yield is 80 grams. The melting point of the compound is 60–61° C. after one more crystallization from water. Its formula is $C_{10}H_{11}N_3$ and it is identical with the di-cyanoethylation product obtained in Example 1. About 40 grams of the mono-cyanoethylation product boiling at 135°/10 mm., identical with that obtained in Example 1, is also secured.

*Example 3*

To a solution of 18 grams of α-ethylidene glutaronitrile, 30 grams of tertiary butanol and 2 grams of "Triton B," there is added, dropwise, 8 grams of acrylonitrile while the reaction mixture is stirred and held at 25–35° C. by external cooling. The mixture is stirred for 18 hours after the addition, then neutralized with dilute hydrochloric acid, taken up in ethylene dichloride, washed with a little water, and the ethylene dichloride layer distilled under reduced pressure. The fraction boiling at 200–220°/1 mm. solidifies on standing. Upon recrystallization from hot water, it forms colorless needles, having a melting point of 60–61° C., and having the formula $C_{10}H_{11}N_3$. This product is identical with the di-cyanoethylation product of crotononitrile or of allyl cyanide described in Example 1 and Example 2.

*Example 4*

To a solution of 81 grams of β-methyl crotononitrile, 25 grams of tertiary butanol and 5 grams of aqueous 40% trimethyl benzyl ammonium hydroxide, there is added, dropwise, 53 grams of acrylonitrile during the course of forty minutes while the reaction mixture is stirred and cooled to 30–40° C. The mixture is stirred for three hours longer at room temperature, then taken up in ethylene dichloride, acidified with hydrochloric acid, washed with 25 cc. of water, and the ethylene dichloride solution separated and distilled in vacuo after evaporating off the solvents. The following fractions are obtained:

I. 26 grams boiling at 70–185°/1 mm. colorless oil

II. 22 grams boiling at 185–205°/1 mm. white solid

III. 20 grams pitchy residue

Fraction I, upon redistillation in vacuo, yields a colorless oil boiling at 145–155°/10 mm., having the formula $C_8H_{10}N_2$ and the probable structure:

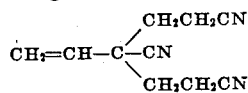

Fraction II is crystallized from methanol or water and separates in colorless needles melting at 67–68° C. having the formula $C_{11}H_{13}N_3$, corresponding to a di-cyanoethylation product having the probable formula:

Example 5

A mixture consisting of 98 grams of anhydrous powdered cuprous cyanide, 1 gram of potassium iodide and 90 grams of a mixture of $$CH_3CH=CH-CH_2Cl \text{ and } CH_2=CH-CHCl-CH_3$$

(as obtained by the high temperature chlorination of butylene) is stirred and boiled under reflux for three hours and the reaction product distilled directly in vacuo at 75–80 mm. The liquid obtained is refractionated through an efficient column at 760 mm. and the cut boiling at 144–145° C. ($n_D^{25}$ 1.4229) collected. It consists of a mixture of

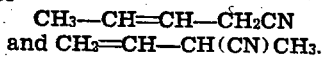

$$CH_3-CH=CH-CH_2CN$$
$$\text{and } CH_2=CH-CH(CN)CH_3.$$

To a mixture of 50 grams of tertiary butanol and 5 grams of Triton B, there is added, dropwise, while mixture is stirred and cooled to 30–40° C., 40.5 grams of the above mixed pentenonitriles. After all has been added, 26.5 grams of acrylonitrile is run in, dropwise, while the mixture is stirred and the reaction temperature maintained at 35–40° C. by external cooling. After being stirred 18 hours at room temperature, the solution is acidified with dilute hydrochloric acid, taken up in ethylene dichloride, washed with water, and the ethylene dichloride layer evaporated to dryness on a steam bath. The residual oil, weighing 62 grams, is distilled in vacuo. The fraction boiling at 140–150°/10 mm. is a colorless oil having the formula $C_8H_{10}N_2$, corresponding to a mono-cyanoethylation product of the mixed isomeric pentenonitriles. The fraction boiling at 200–210°/1 mm. is a thick, pale yellow liquid having the formula $C_{11}H_{13}N_3$, corresponding to the di-cyanoethylation products of the mixed pentenonitriles.

Example 6

Acrylonitrile (16 grams) is added gradually to a cooled solution of 40 grams of α-ethylidene-β-methyl glutaronitrile, 40 grams of tertiary butanol and 3 grams of an aqueous solution containing 40% of trimethyl benzyl ammonium hydroxide while the reaction mixture is stirred and maintained at 30–35° C. The mixture is then stirred for 18 hours longer, acidified with dilute hydrochloric acid, taken up in ethylene dichloride, washed with a little water, and distilled under reduced pressure. The product boiling at 195–200° C./1 mm. is a colorless, thick liquid having the formula $C_{11}H_{13}N_3$, corresponding to the probable structure:

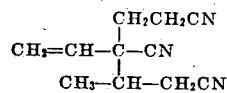

$$\begin{array}{c} CH_2CH_2CN \\ | \\ CH_2=CH-C-CN \\ | \\ CH_3-CH-CH_2CN \end{array}$$

Example 7

Acrylonitrile (1 mol) is added, dropwise, to a solution of 0.5 mol of cyclohexylidene acetonitrile dissolved in 60 grams of tertiary butanol containing 5 grams of aqueous 40% trimethyl benzyl ammonium hydroxide. The mixture is stirred constantly during the addition, which requires about forty minutes. An exothermic reaction occurs and the reaction mixture is held at 28–37° C. by external cooling during the addition of acrylonitrile. After all of it has been added, the mixture is stirred four hours at room temperature, then acidified to litmus with dilute hydrochloric acid, taken up in an equal volume of ethylene dichloride and the mixture washed twice with water. The ethylene dichloride layer, upon evaporation, yields 105 grams of oil which is distilled in vacuum at 1 mm. absolute pressure. The main product distills between 230 and 235°/1 mm. as a pale yellow, thick oil which rapidly solidifies to a hard, crystalline mass. Upon recrystallization from methanol, the pure compound forms colorless crystals melting at 81–82° C., having the formula $C_{14}H_{17}N_3$, and corresponding to a di-cyanoethylation product, formed according to the probable equation:

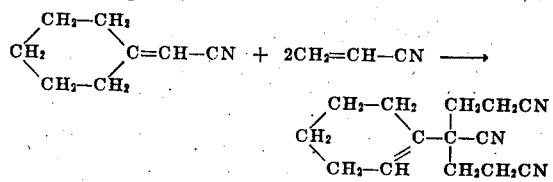

The yield of pure product is 40 grams.

Example 8

Acrylonitrile (42.4 grams) is added, dropwise, to a stirred solution consisting of 60 grams of tertiary butanol, 5 grams of an aqueous solution containing 40% of trimethyl benzyl ammonium hydroxide and 60.4 grams of 4-ethyl-2-octenonitrile, $CH_3(CH_2)_3CH(C_2H_5)-CH=CHCN$. The resulting exothermic reaction is controlled by cooling to 30–35° C. After all the acrylonitrile has been added, the mixture is stirred four hours longer at room temperature, then acidified with dilute hydrochloric acid, washed with water thoroughly, dried, and distilled in vacuum. The product boiling at 215–220°/0.5 mm. is a pale yellow oil weighing 50 grams, having the formula $C_{16}H_{23}N_3$, and corresponding to the probable structure:

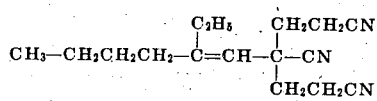

The 4-ethyl-2-octenonitrile used is a colorless liquid boiling at 109–111°/11 mm., which can be obtained by condensing α-ethyl hexaldehyde with cyanacetic acid in the presence of pyridine.

Example 9

Acrylonitrile (18 grams) is added, dropwise, to a stirred solution of 25 grams of tertiary butanol, 3 grams of an aqueous solution containing 40% of trimethyl benzyl ammonium hydroxide and 25.5 grams of 3-methyl-2-nonenonitrile,

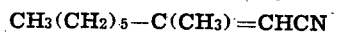

$$CH_3(CH_2)_5-C(CH_3)=CHCN$$

at 33–40° C. during 25 minutes. The mixture is then stirred for 18 hours at room temperature, acidified with dilute hydrochloric acid, washed with water, dried, and the residual oil (40 grams) distilled under a good vacuum. The product boiling at 215–219°/0.5 mm. is a pale yellow, viscous oil having the formula $C_{16}H_{23}N_3$, and corresponding to the probable structure:

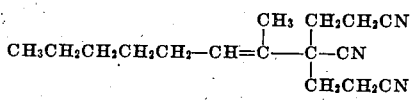

In the same manner, other unsaturated nitriles of the type herein set forth can be condensed with acrylonitrile to give mono-cyanoethylation or di-cyanoethylation products.

I claim:

1. A method for preparing unsaturated polynitriles containing at least one β-cyanoethyl radical attached to an aliphatic carbon atom, which comprises reacting in the presence of an alkaline condensing agent at a temperature of about 0° C.

to about 80° C. acrylonitrile and an unsaturated nitrile having a three-carbon desmotropic system adjacent to the nitrile group thereof.

2. A method for preparing unsaturated polynitriles containing two β-cyanoethyl radicals attached to an aliphatic carbon atom, which comprises reacting in the presence of an alkaline condensing agent at a temperature of about 0° C. to about 80° C. acrylonitrile and an unsaturated nitrile having a three-carbon desmotropic system adjacent to the nitrile group thereof.

3. A method for preparing unsaturated polynitriles containing at least one β-cyanoethyl radical attached to an aliphatic carbon atom, which comprises reacting in the presence of a quaternary ammonium hydroxide at a temperature of about 0° C. to about 80° C. acrylonitrile and an unsaturated nitrile having a three-carbon desmotropic system adjacent to the nitrile group thereof.

4. A method for preparing unsaturated polynitriles which comprises reacting in the presence of an alkaline condensing agent at a temperature of about 0° C. to about 80° C. acrylonitrile and β-methyl crotononitrile.

5. A method for preparing unsaturated polynitriles which comprises reacting in the presence of an alkaline condensing agent at a temperature of about 0° C. to about 80° C. acrylonitrile and cyclohexylidene acetonitrile.

6. A method for preparing unsaturated polynitriles which comprises reacting in the presence of an alkaline condensing agent at a temperature of about 0° C. to about 80° C. acrylonitrile and crotononitrile.

7. As a new compound, an addition product of acrylonitrile and an unsaturated nitrile having a three-carbon desmotropic system contiguous to the nitrile group thereof, said addition product consisting of carbon, hydrogen, and nitrogen, having a chain of at least three carbon atoms attached to a nitrile group, said chain containing an olefinic linkage within three carbon atoms of the nitrile group, and having at least one β-cyanoethyl radical attached to the carbon atom contiguous to said nitrile group.

8. As a new compound, an addition product of acrylonitrile and an unsaturated nitrile having a three-carbon desmotropic system contiguous to the nitrile group thereof, said addition product consisting of carbon, hydrogen, and nitrogen, having a chain of at least three carbon atoms attached to a nitrile group, said chain containing an olefinic linkage within three carbon atoms of the nitrile group, and having one β-cyanoethyl radical attached to the carbon atom contiguous to said nitrile group.

9. As a new compound, an addition product of acrylonitrile and an unsaturated nitrile having a three-carbon desmotropic system contiguous to the nitrile group thereof, said addition product consisting of carbon, hydrogen, and nitrogen, having a chain of at least three carbon atoms attached to a nitrile group, said chain containing an olefinic linkage within three carbon atoms of the nitrile group, and having two β-cyanoethyl radicals attached to the carbon atom contiguous to said nitrile group.

10. As a new compound, an addition product of acrylonitrile and crotononitrile, said addition product consisting of carbon, hydrogen, and nitrogen, having a chain of three carbon atoms attached to a nitrile group which chain contains an olefinic linkage, and having at least one β-cyanoethyl radical attached to the carbon atom contiguous to said nitrile group.

11. As a new compound, an addition product of acrylonitrile and crotononitrile, said addition product consisting of carbon, hydrogen, and nitrogen, having a chain of three carbon atoms attached to a nitrile group which chain contains an olefinic linkage, and having two β-cyanoethyl radicals attached to the carbon atom contiguous to said nitrile group.

12. As a new compound, an addition product of acrylonitrile and β-methyl crotononitrile, said addition product consisting of carbon, hydrogen, and nitrogen, having a chain of three carbon atoms which contains an olefinic linkage, which carries on the mid carbon atom thereof a methyl group, and which is attached to a nitrile group, and having at least one β-cyanoethyl group attached to the carbon atom contiguous to said nitrile group.

13. As a new compound, an addition product of acrylonitrile and β-methyl crotononitrile, said addition product consisting of carbon, hydrogen, and nitrogen, having a chain of three carbon atoms which contains an olefinic linkage, which carries on the mid carbon atom thereof a methyl group, and which is attached to a nitrile group, and having two β-cyanoethyl groups attached to the carbon atom contiguous to said nitrile group.

14. As a new compound, an addition product of acrylonitrile and cyclohexylidene acetonitrile, said addition product consisting of carbon, hydrogen, and nitrogen and having two β-cyanoethyl groups attached to an aliphatic carbon atom which carries a nitrile group and which is attached to a hydrogen-free carbon atom forming part of a cyclohexylidene group and carrying a double bond.

HERMAN A. BRUSON.